United States Patent
Sano et al.

(10) Patent No.: US 6,846,353 B2
(45) Date of Patent: Jan. 25, 2005

(54) INK SET COMPRISING BLACK INK COMPOSITIONS, AND RECORDING METHOD, RECORDED MATTER AND INK-JET RECORDING APPARATUS USING THE SAME

(75) Inventors: Tsuyoshi Sano, Nagano (JP); Seishin Yoshida, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 42 days.

(21) Appl. No.: 10/603,074

(22) Filed: Jun. 24, 2003

(65) Prior Publication Data

US 2004/0035320 A1 Feb. 26, 2004

(30) Foreign Application Priority Data

Jun. 27, 2002 (JP) ..................................... P.2002-188600

(51) Int. Cl.$^7$ ............................. C09D 11/02; B41J 2/01
(52) U.S. Cl. ................ 106/31.6; 106/31.75; 106/31.78; 106/31.89; 347/100
(58) Field of Search ............................ 106/31.6, 31.75, 106/31.78, 31.89; 347/100

(56) References Cited

U.S. PATENT DOCUMENTS

| | | | |
|---|---|---|---|
| 5,803,958 A | | 9/1998 | Katsen et al. ............. 106/31.65 |
| 6,565,202 B2 | * | 5/2003 | Rose et al. .................. 347/100 |
| 6,676,738 B2 | * | 1/2004 | Sano et al. ............... 106/31.75 |
| 6,726,758 B2 | * | 4/2004 | Sano .......................... 106/31.6 |
| 2003/0226473 A1 | * | 12/2003 | Ishimoto ..................... 106/31.6 |
| 2004/0016367 A1 | * | 1/2004 | Koike et al. ............. 106/31.86 |
| 2004/0127601 A1 | * | 7/2004 | Sano et al. .................. 523/160 |

FOREIGN PATENT DOCUMENTS

| | | |
|---|---|---|
| JP | 64-180 | 1/1989 |
| JP | 11-48502 | 2/1999 |

* cited by examiner

*Primary Examiner*—Helene Klemanski
(74) *Attorney, Agent, or Firm*—Ladas & Parry LLP (57) ABSTRACT

The present invention provides an ink set comprising at least two black ink compositions each containing a carbon black and a complementary colorant, wherein the at least two black ink compositions have different carbon black contents from one another, and wherein the complementary colorants of at least two of the black ink compositions are different from one another. Also disclosed are a recording method, recorded matter and a recording apparatus using the ink set.

20 Claims, 3 Drawing Sheets

INK SET COMPRISING BLACK INK COMPOSITIONS, AND RECORDING METHOD, RECORDED MATTER AND INK-JET RECORDING APPARATUS USING THE SAME

FIELD OF THE INVENTION

The present invention relates to an ink set comprising at least two black ink compositions which have different carbon black concentrations from one another, and further relates to a recording method using the same, recorded matter obtained using the same, and an ink-jet recording apparatus using the same.

BACKGROUND OF THE INVENTION

In the case where an image is formed by an ink-jet recording method or the like, there may be sometimes used an ink set comprising a light black ink for the purpose of obtaining a high quality image. For example, to a four-color ink set comprising a black ink, a cyan ink, a magenta ink and a yellow ink (or a six-color ink set further comprising a light cyan ink and a light magenta ink added thereto) may be added a light black ink to make a five-color ink set (or seven-color ink set). The light black ink has a lower carbon black concentration as compared with the black ink and is used for the purpose of improving the color reproducibility with respect to dark color such as shadow area or improving the gradation of gray.

However, since the light black ink (i.e., light black ink) has a low carbon black content, the resulting color hue is tinted rather than achromatic one which is originally necessary. In other words, the light black ink deviates from (a*, b*)=(0, 0) in the L*a*b* space of color difference representation method defined in CIE (Commission International de l'Eclairage). In some detail, the light black ink is tinted yellow. In order to modify the yellowing property of carbon black, it is necessary to use a colorant (e.g., pigment) complementary against yellow.

For example, U.S. Pat. No. 5,803,958 discloses a black pigment ink composition comprising a cyan pigment and a magenta pigment in addition to a carbon black. That is, it is described that the mixing of a cyan pigment and a magenta pigment achieves an effect similar to the effect in the case of adding a blue pigment and the use of this black ink composition as a light black ink composition makes it possible to improve the foregoing problem concerning yellowing property.

On the other hand, even when a black ink having a high carbon black content (i.e., dark black ink) is used, it is known that the resulting color hue is tinted red rather than achromatic one which is originally necessary. As a means for modifying such a reddening property, JP-A-64-180 discloses a method of adding a copper phthalocyanine pigment, for example.

However, no precise report on the relation between such yellowing and reddening properties and a carbon black content is known until now. Moreover, a method of modifying the yellowing property in the light black ink and the reddening property in the dark black ink has not even proposed in the art.

Separately, an ink-jet recording method using two or more black inks having different carbon black concentrations are also known and the addition of different types of dyes or pigments to a black ink having a high concentration and a black ink having a low concentration is also know (JP-A-11-48502). However, as the dyes or pigments to be added to these individual black inks, it is only described that black dyes are used singly or as a mixture, or a yellow, a magenta, and a cyan are used in combination. Thus, means of modifying the above yellowing property and reddening property at the same time is not even suggested.

SUMMARY OF THE INVENTION

An object of the present invention is to provide means of suitably modifying the yellowing property and reddening property at the same time in an ink set wherein a dark black ink and a light black ink are used in combination.

Other objects and effects of the present invention will become apparent from the following description.

The above-described objects of the present invention have been achieved by providing:

an ink set comprising at least two black ink compositions each containing a carbon black and a complementary colorant, wherein the at least two black ink compositions have different carbon black contents from one another, and wherein the complementary colorants of at least two of the black ink compositions are different from one another.

BRIEF DESCRIPTION OF THE DRAWINGS

FIG. 2 are explanatory drawings schematically showing a situation of ejecting ink liquid droplets using a light black ink (FIG. 2(1)) or a dark black ink (FIG. 2(2)) by adjusting duty such that carbon black in an amount required for expressing the same gray color attaches onto the unit area of the recording medium surface.

DETAILED DESCRIPTION OF THE INVENTION

First, the principle of the invention is described below.

As is illustrated specifically in Comparative Examples below, the present inventors have first prepared a dark black ink containing carbon black in a high content almost equal to the case of the black ink generally used as a dark black ink in an ink set for ink-jet recording and have produced a gray scale (a gradation pattern of 18 stages from white to black via gray). When each gradation has been measured for color and plotted in the coordinates of a* and b* in L*a*b* color specification system of color difference representation method defined in CIE, a gray scale locus schematically shown by a curve d in FIG. 1 has been depicted.

In the coordinates of a* and b*, the intersection point of axes of a* and b*, i.e., the origin (a*=0 and b*=0) is achromatic. For example, deviation to the + (plus) direction of b* axis (the Y direction in FIG. 1) increases a yellow tint in proportion to the degree of the deviation, and deviation to the − (minus) direction (the B direction in FIG. 1) increases a blue tint in proportion to the degree of the deviation. Also, deviation from the above origin to the direction of dotted line C increases a cyan tint. Similarly, deviation from the above origin to the direction of dotted line M increases a magenta tint. Furthermore, the dotted lines G and R show the directions of green and red, respectively.

Figure 1:
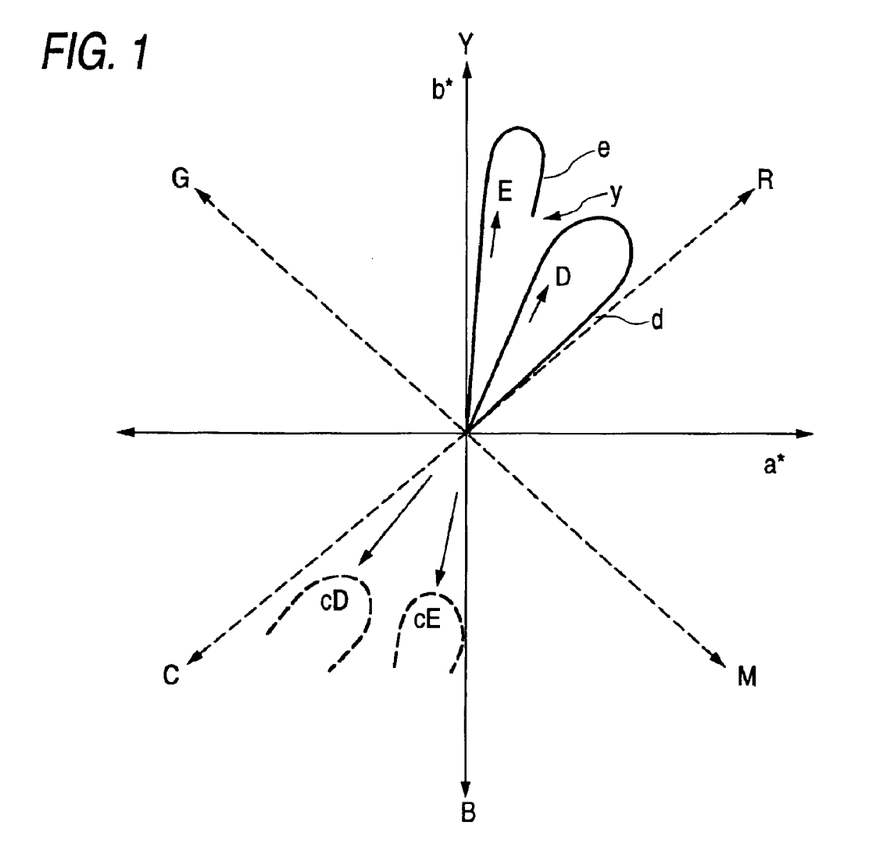
FIG. 1 is an explanatory drawing schematically showing a gray scale locus plotted in the coordinates of a* and b* in the L*a*b* color specification system of color difference representation method defined in CIE.
Figure 2:
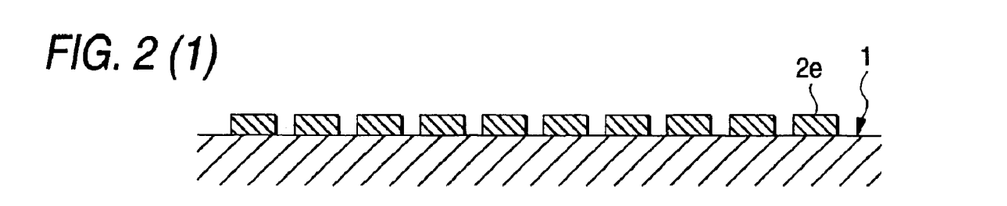

Namely, the gray scale locus of the curve d in FIG. 1 showed a locus from achromatic white (a*=0 and b*=0) to a chromatic state in the direction of arrow D as the gray color deepened and finally returned to the vicinity of achromatic black (a*=0 and b*=0) (in the actually measured data, the locus do not strictly return to the origin showing an ideal black, but FIG. 1 schematically illustrates the return to the origin).

Subsequently, the inventors have prepared a light black ink containing carbon black in a high content almost equal to the case of the black ink generally used as a light ink in an ink set for ink-jet recording, and produced a gray scale (a gradation pattern of 18 stages), and then each gradation has been measured for color and plotted in the coordinates of a* and b* in L*a*b* color specification system.

As schematically illustrated in FIG. 2, in the case that a specific gray color is expressed using a light black ink (FIG. 2 (1)) or a dark black ink (FIG. 2 (2)), ink droplets are ejected so as to attach carbon black in an amount required for expressing the specific gray color per unit area of a recording medium surface 1. For example, as shown in FIG. 2 (1), in the case of using a light black ink, the content of carbon black 2e in each ink droplet is small, so that it is necessary to print at a high duty. On the other hand, as shown in FIG. 2 (2), in the case of using a dark black ink, the content of carbon black 2d in each ink droplet is large, so that it is necessary to print at a low duty.

Figure 3:
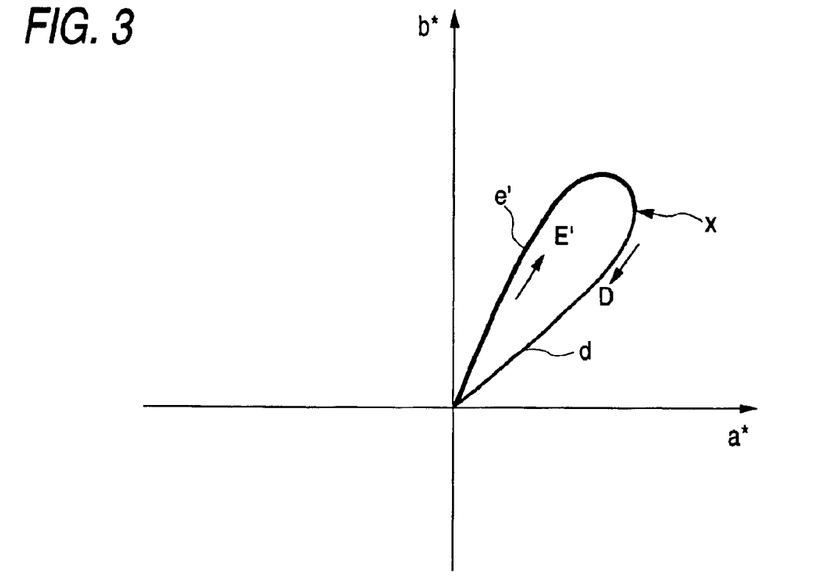
FIG. 3 is an explanatory drawing schematically showing overlap of a hypothetical gray scale locus of a light black ink with a gray scale locus of a dark black ink composition plotted in the coordinates of a* and b* in the L*a*b* color specification system of color difference representation method defined in CIE.

In each of these cases, the amount of carbon black to be supported per unit area is the same, so that a gray scale prepared from the above light black ink should overlap the gray scale locus of the curve d in FIG. 1 and depict a locus shown by a bold line e' in FIG. 3. That is, a gray scale locus of the bold line e' in the direction of an arrow E' from the white color (a*=0 and b*=0) at the point of 0% duty to the point of 100% duty (end point x of the bold line e') should be depicted.

Surprisingly, however, the actual gray scale locus results in a curve e shown in FIG. 1 and has widely shifted to a yellow side as compared with the expected gray scale locus (the bold line e' in FIG. 3). In other words, it has been found that a locus from the white color (a*=0 and b*=0) at the point of 0% duty to the point of 100% duty along the direction of an arrow E is depicted.

As a summary of the above results, in the case that a gray scale is produced with a dark black ink, as shown in the curve d in FIG. 1, there is a tendency that a light gray color (the case where the number of liquid droplets ejected per unit area on a recording medium is relatively few and the amount of carbon black per unit area is small; the case of a low duty) is tinged with a hue between yellow and red, and a dark gray color (the case where the number of liquid droplets ejected per unit area on a recording medium is relatively many and the amount of carbon black per unit area is large; the case of a high duty) is tinged with a red hue. On the other hand, in the case that a gray scale is produced with a light black ink, as shown in the curve e in FIG. 1, there is a tendency that the locus shifts to a yellow side as compared with the expected gray scale locus (the bold line e' in FIG. 3). Moreover, with the dark black ink, a remarkable deviation from an achromatic hue is observed especially at a medium gradation, and with the light black ink, a remarkable deviation from an achromatic hue is observed at between a medium gradation and a dark gradation.

The reason why such a phenomenon is induced depending on the difference of the carbon black content contained in the black ink and the difference of duty is not clear even for the inventors but there is hitherto no report on such a phenomenon. Therefore, in the ink set wherein a dark black ink and a light black ink are used in combination, any technique for modifying suitably the reddening property and yellowing property thereof is hitherto not known.

The invention provides means for modifying suitably the reddening property and yellowing property at the same time in the ink set wherein a dark black ink and a light black ink are used in combination.

Namely, in a plurality of black ink compositions contained in the ink set of the invention, each black ink composition depicts a different gray scale locus depending on the difference of the carbon black content thereof, so that a colorant complementary to each gray scale locus is selected and added. For example, to the dark black ink composition depicting the locus d in FIG. 1, a colorant complementary thereto (a colorant of a region cD in FIG. 1) is selected and added, while to the light black ink composition depicting the locus e, a colorant complementary thereto (a colorant of a region cE in FIG. 1) is selected and added.

Next, the carbon black contents of the black ink compositions in the ink set of the invention are described below.

In general, in the case that an ink set comprises two or more black ink compositions having different carbon black concentrations, there is no special limitation and provision for the range of the carbon black concentration in each black ink composition. For example, even in an ink set for ink-jet recording, there is no provision that a black ink composition having a carbon black concentration higher than a certain specific concentration is referred to as a dark black ink composition or a black ink composition having a carbon black concentration lower than a certain specific concentration is referred to as a light black ink composition.

Therefore, in the case that an ink set for ink-jet recording contains a light black ink composition and a dark black ink composition, the carbon black concentration in the latter dark composition is simply higher than the carbon black concentration in the former light composition. Moreover, when certain two ink sets for ink-jet recording are compared, there is a possibility that the carbon black concentration in the dark black ink composition in one ink set is lower than the carbon black concentration in the light black ink composition in another ink set. Furthermore, there exists a similar situation in the case that an ink set for ink-jet recording contains three or more black ink compositions. For example, there is, of course, a possibility that the carbon black concentration in the black ink composition for medium gradation in one ink set is lower than the carbon black concentration in the light black ink composition in another ink set.

Accordingly, also in two or more black ink compositions for use in the ink set (e.g., ink set for ink-jet recording) of the invention, each carbon black concentration range thereof is not particularly limited. For example, in the case that the ink set of the invention contains two black ink compositions, a light black ink composition and a dark black ink composition are not classified based on a certain specific value of carbon black concentration as a standard but by simply comparing the carbon black concentration of both compositions, the lighter one is simply referred to as a light carbon black composition and another one as a dark black ink composition. Similarly, in the case that the ink set (e.g., ink set for ink-jet recording) of the invention contains three black ink compositions, a light black ink composition, a black ink composition for medium gradation, and a dark black ink composition are not classified based on a certain specific value of carbon black concentration as a standard but by simply comparing the carbon black concentration of the three compositions, thereby determining the light carbon black composition, the black ink composition for medium gradation, and the dark black ink composition. Therefore, when two ink sets (e.g., ink set for ink-jet recording) belonging to the invention are compared, there may be a possibility that the carbon black concentration in the dark black ink composition in one ink set is lower than the carbon black concentration in the light black ink composition in another ink set.

In the ink set of the invention, a suitable complementary colorant for a black ink composition containing a certain specific amount of carbon black can be selected by the following procedure, for example. That is, as mentioned above, a gray scale on a black ink composition containing carbon black alone is produced, and each gradation is measured for color and plotted in the coordinates of $a^*$ and $b^*$ in $L^*a^*b^*$ color specification system of color difference representation method defined in CIE to depict a gray scale locus in the first quadrant of the coordinates of $a^*$ and $b^*$. A hypothetical locus which is symmetric to the gray scale with respect to a point of the origin ($a^*=0$ and $b^*=0$) is depicted in the third quadrant of the above coordinates of $a^*$ and $b^*$ and a colorant having a color hue overlapping with the color hue of the hypothetical locus is looked for, thereby the colorant (i.e., a complementary colorant) is selected.

With regard to the case that the ink set (especially ink set for ink-jet recording) of the invention contains two black ink compositions, the content of carbon black in a light black ink composition having a low carbon black concentration is, for example, from 0.01 to 1% by weight based on the total weight of the light black ink composition, and the content of carbon black in a dark black ink composition having a high carbon black concentration is, for example, from 1 to 10% by weight based on the total weight of the dark black ink composition, when a suitable complementary colorant is specifically explored according to the above procedure, it has been found that an ideal nearly achromatic hue can be obtained together with suitable modification of a coloring property at medium gradations by adding a pigment represented by general formula (1):

wherein p represents an integer of 0 to 3 as a complementary colorant to the light black ink composition, and adding a pigment represented by formula (2):

to the dark black ink composition as a complementary colorant.

Among the pigments represented by the above formula (1), the compound wherein p is 0 is known as Color Index Pigment Blue 60 (C.I. PB60). In addition, the pigments represented by the above formula (2) are phthalocyanine pigments and are known as Color Index Pigment Blue 15:3, Color Index Pigment Blue 15:4, or the like.

The content of the pigment represented by the above general formula (1) in the above light black ink composition having a carbon black content of 0.01 to 1% by weight is not particularly limited but is preferably, for example, from 0.01 to 0.5% by weight based on the total weight of the light black ink composition. The content of the pigment represented by the above formula (2) in the above dark black ink-composition having a carbon black content of 1 to 10% by weight is also not particularly limited but is preferably, for example, from 0.1 to 5% by weight based on the total weight of the dark black ink composition.

Furthermore, with regard to the case that the ink set (especially ink set for ink-jet recording) of the invention contains three black ink compositions, the content of carbon black in a light black ink composition having the lowest carbon black concentration is, for example, from 0.01 to 0.4% by weight based on the total weight of the light black ink composition, the content of carbon black in a black ink composition for medium gradation having a medium carbon black concentration is, for example, from 0.4 to 1.5% by weight based on the total weight of the black ink composition for medium gradation, and the content of carbon black in a dark black ink composition having the highest carbon black concentration is, for example, from 1.5 to 10% by weight based on the total weight of the dark black ink composition, when a suitable complementary colorant is specifically explored according to the above procedure, it has been found that an ideal nearly achromatic hue can be obtained together with suitable modification of a coloring property at medium gradations by adding a pigment represented by the above general formula (1) to the light black ink composition and adding a pigment represented by the above formula (2) to the dark black ink composition.

In the ink set comprising the above three black ink compositions, the content of the pigment represented by the above general formula (1) in the above light black ink composition having a carbon black content of 0.01 to 0.4% by weight is not particularly limited but is preferably, for example, from 0.01 to 0.3% by weight based on the total weight of the light black ink composition. The content of the pigment represented by the above formula (2) in the above dark black ink composition having a carbon black content of 1.5 to 10% by weight is also not particularly limited but is preferably, for example, from 0.1 to 5% by weight based on the total weight of the dark black ink composition.

With regard to the black ink composition for medium gradation, it has been found that the pigment represented by the above general formula (1) or (2) is preferably added thereto after being suitably selected. That is, it is preferable that a black ink composition for medium gradation having a carbon black content of 0.4 to 1% by weight is incorporated with the pigment represented by the above general formula (1) and a black ink composition for medium gradation having a carbon black content of 1 to 1.5% by weight is incorporated with the pigment represented by the above general formula (1) and/or the pigment represented by the above formula (2).

The content of the pigment represented by the above general formula (1) in the above black ink composition for medium gradation having a carbon black content of 0.4 to 1% by weight is not particularly limited but is preferably, for example, from 0.01 to 0.3% by weight based on the total weight of this black ink composition for medium gradation. The content of the pigment represented by the above general formula (1) in the above black ink composition for medium gradation having a carbon black content of 1 to 1.5% by weight is also not particularly limited but is preferably, for example, from 0.01 to 0.3% by weight based on the total weight of this black ink composition for medium gradation. Furthermore, the content of the pigment represented by the above formula (2) in the above black ink composition for medium gradation having a carbon black content of 1 to 1.5% by weight is also not particularly limited but is preferably, for example, from 0.1 to 5% by weight based on the total weight of this black ink composition for medium gradation.

The ratio of the amount of the carbon black to the complementary colorant contained in each black ink composition of the invention is not particularly limited. It only requires that the complementary colorant be contained in an amount such that the coloring property of individual carbon blacks used can be modified. In order to determine the content specifically, a gray scale locus on the recorded image formed by an ink composition containing the carbon black and the above complementary colorant used in a specific proportion is produced as in the above and a degree of modification of the coloring property is evaluated. Taking into account the evaluation results, the proportion of both components can be adjusted so as to properly modify the coloring property.

In addition, each black ink composition contained in the ink set of the invention preferably contains no further colorant other than carbon black and the above complementary colorant as colorants.

The ink set of the invention may contain at least two black ink compositions having different carbon black concentrations. As the carbon black for use in these black ink compositions, there can be used a carbon black prepared by any known method such as contact method, furnace method or thermal method. Examples of the carbon black employable herein include No. 2300, No. 900, MCF88, No. 33, No. 40, No. 45, No. 52, MA7, MA8, MA100 and No. 2200B mfd. by Mitsubishi Chemical Corporation; Raven 5750, Raven 5250, Raven 5000, Raven 3500, Raven 1255 and Raven 700 mfd. by Columbian Carbon Inc.; Regal 400R, Regal 330R, Regal 660R, Mogul L, Monarch 700, Monarch 800, Monarch 880, Monarch 900, Monarch 1000, Monarch 1100, Monarch 1300 and Monarch 1400 mfd. by Cabot Specialty Chemicals Inc., and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A and Special Black 4 mfd. by Degussa Inc.

The particle size of carbon black is not particularly limited but is preferably 10 $\mu$m or less, more preferably 0.1 $\mu$m or less.

In the same ink set, the carbon blacks contained in the respective black ink compositions may be the same or different from one another, Except for containing the complementary colorant, the black ink compositions contained in the ink set of the invention can contain the same constituents as in the conventional known black ink composition and can be prepared to form an organic ink or preferably an aqueous ink. The black ink compositions can be used as an ink for various known recording methods, preferably an ink for ink-jet recording.

The following will briefly describe the invention with reference to the case where the ink set of the invention is used for ink-jet recording and each black ink composition is an aqueous ink composition.

In the aqueous black ink composition for ink-jet recording, the carbon black and the above-described complementary colorant are preferably added in the form of a pigment dispersion, e.g., a dispersion obtained by dispersing them in an aqueous medium with a dispersant.

The aqueous black ink composition for ink-jet recording of the invention may further contain a surfactant. Specific examples of the surfactant include anionic surfactants (e.g., sodium dodecylbenzenesulfonate, sodium laurate, ammonium salt of polyoxyethylene alkyl ether sulfate), nonionic surfactants (e.g., polyoxyethylene alkyl ether, polyoxyethylene alkyl ester, polyoxyethylene-sorbitan aliphatic acid ester, polyoxyethylene alkyl phenyl ether, polyoxyethylenealkylamine, polyoxyethylene alkyl amide), and amphoteric surfactants (e.g., N,N-dimethyl-N-carboxymethylammonium betain, N,N-dialkylaminoalkylenecarboxylate salt, N,N,N-trialkyl-N-sulfoalkyleneammonium betain, N,N-dialkyl-N,N-bispolyoxyethyleneammonium sulfate ester betain, 2-alkyl-1-carboxymethyl-1-hydroxyethylimidazolinium betain). These surfactants may be used singly or in combination of two or more thereof.

The black ink composition of the invention preferably contains an acetylene glycol-based surfactant. The incorporation of such an acetylene glycol-based surfactant makes it possible to improve the penetrating power of the ink compositions into the recording medium. Thus, printing with little blurring can be expected in various recording media. A preferable specific example of the acetylene glycol-based surfactant to be incorporated in the black ink compositions for use in the invention includes a compound represented by the following general formula (3):

wherein $0 \leq m+n \leq 50$; and $R^1$, $R^2$, $R^3$ and $R^4$ each independently represents an alkyl group, preferably an alkyl group having 6 or less carbon atoms.

Among the compounds represented by general formula (3), particularly prefrred are 2,4,7,9-tetramethyl-5-decyne-4,7-diol, 3,6-dimethyl-4-octyne-3,6-diol, and 3,5-dimethyl-1-hexyne-3-ol. As the acetylene glycol-based surfactant represented by general formula (3), there may be used a commercially available product. Specific examples thereof include Surfynol 104, 82, 465, 485 and TG available from Air Products and Chemicals, Inc., and Orfin STG and Orfin E1010 mfd. by Nissin Chemical Industry Co., Ltd.

The black ink composition for use in the invention preferably contains a silicone-based surfactant represented by general formula (4):

wherein $R^{11}$ to $R^{17}$ each independently represents a $C_{1-6}$ alkyl group, j and k each independently represents an integer of 1 or more, EO represents an ethyleneoxy group, PO represents a propyleneoxy group, and s and t each represents an integer of 0 or more, provided that s plus t represents an integer of 1 or more, the order of EO and PO is not limited in a parenthesis, and they may be arranged randomly or as blocks. The addition thereof can improve penetrating power of the ink composition into a recording medium.

In the silicone-based surfactant represented by the above general formula (4), preferable compounds are those wherein, in the above general formula (4), $R^{11}$ to $R^{17}$ each independently is a $C_{1-6}$ alkyl group, more preferably a methyl group, j and k each independently is an integer of 1 or more, more preferably 1 or 2, and s and t each is an integer of 0 or more, provided that s plus t is an integer of 1 or more, more preferably s plus t is an integer of 2 to 4.

In the silicone-based surfactant represented by the above general formula (4), particularly preferable compounds are those wherein, in the above formula (4), j and k are the same and each is an integer of 1 to 3, particularly 1 or 2. More preferable compounds represented by the above general formula (4) are those wherein all of $R^{11}$ to $R^{17}$ represent methyl groups, j represents 1, k represents 1, u represents 1, s represents 1, s represents an integer of 1 or more, particularly an integer of 1 to 5, and t represents 0.

The amount of the silicone-based surfactant represented by the above general formula (4) to be added may be suitably determined but is preferably from 0.03 to 3% by weight, more preferably from about 0.1 to 2% by weight, further preferably from about 0.3 to 1% by weight based on the total weight of the back ink composition for use in the invention.

The silicone-based surfactant represented by the above general formula (4) is commercially available and it is possible to utilize the commercially available product. For example, a silicone-based surfactant BYK-347 or BYK-348 commercially available from Bigchemie Japan K.K. can be utilized.

The amount of the surfactant to be incorporated in the aqueous black ink composition for ink-jet recording is not particularly limited but preferably is from 0.01 to 10% by weight, more preferably from 0.1 to 5% by weight. When the content of the surfactant falls below 0.01% by weight, a sufficient surface activating effect cannot be obtained. To the contrary, when the content of the surfactant exceeds 10% by weight, it may cause precipitation of crystals, formation of liquid crystals or stability deterioration of pigment, which brings about ejection failure.

In the invention, the complementary colorant may be a pigment or dye. The pigment is dispersed in the ink composition with a dispersant for dispersing pigments.

In a preferred embodiment of the invention, these pigments are preferably added to the ink composition in the form of a pigment dispersion obtained by dispersing the pigment in an aqueous medium with a dispersant.

As the dispersant, there may be suitably used a conventional surfactant or a dispersant which is commonly used to prepare a pigment dispersion, such as polymer dispersant. It will be apparent to those skilled in the art that the dispersant contained in the pigment dispersion also acts as a dispersant and a surfactant for the ink composition.

As a more preferred dispersant, there may be used a polymer dispersant, particularly a resin dispersant.

Preferred examples of such a polymer dispersant include natural polymers. Specific examples thereof include proteins such as glue, gelatin, casein and albumin, natural rubbers such as gum arabic and tragacanth gum, glucocides such as saponin, alginic acid derivatives such as alginic acid, alginic acid propylene glycol ester, triethanolamine alginate and ammonium alginate, and cellulose derivatives such as methyl cellulose, carboxymethyl cellulose, hydroxyethyl cellulose and ethylhydroxy cellulose.

Other preferred examples of the polymer dispersant include synthetic polymers. Specific examples thereof include polyvinyl alcohols, polyvinyl pyrrolidones, acrylic resins such as polyacrylic acid, acrylic acid-acrylonitrile copolymer, acrylate salt-acrylonitrile copolymer, vinyl acetate-acrylic acid ester copolymer and acrylic acid-acrylic acid ester copolymer, styrene-acryl resins such as styrene-acrylic acid copolymer, styrene-methacrylic acid copolymer, styrene-methacrylic acid-acrylic acid copolymer, styrene-α-methylstyrene-acrylic acid copolymer and styrene-α-methylstyrene-acrylic acid-acrylic acid ester copolymer, styrene-maleic acid copolymer, styrene-maleic anhydride copolymer, isobutylene-maleic acid resin, rosin-modified maleic acid resin, vinyl naphthalene-acrylic acid copolymer, vinyl naphthalene-maleic acid copolymer, and vinyl acetate copolymers such as vinyl acetate-ethylene copolymer, vinyl acetate-fatty acid vinyl ethylene copolymer, vinyl acetate-maleic acid ester copolymer, vinyl acetate-crotonic acid copolymer and vinyl acetate-acrylic acid copolymer, and salts thereof.

Among these compounds, preferred as the dispersant are styrene-acrylic acid copolymers, styrene-methacrylic acid copolymers, acrylic acid-acrylic acid ester copolymers, and styrene-maleic anhydride copolymers.

As the resin dispersant, there may be used a commercially available product. Specific examples thereof include Joncryl 68 (molecular weight: 10,000; acid value: 195), Joncryl 61J (molecular weight: 10,000; acid value: 195), Joncryl 680 (molecular weight: 3,900; acid value: 215), Joncryl 682 (molecular weight: 1,600; acid value: 235), Joncryl 550 (molecular weight: 7,500; acid value: 200), Joncryl 555 (molecular weight: 5,000; acid value: 200), Joncryl 586 (molecular weight: 3,100; acid value: 105), Joncryl 683 (molecular weight; 7,300; acid value: 150), and Joncryl B-36 (molecular weight: 6,800; acid value: 250) mfd. by JOHNSON POLYMER CORPORATION.

The aqueous black ink composition for ink-jet recording contained in the ink set of the invention may contain a water-soluble organic solvent as a wetting agent, drying speed adjustor and/or stabilizer. The content of the water-soluble organic solvent to be incorporated in the respective ink composition is preferably from about 0.5 to 40% by weight, more preferably from 2 to 30% by weight based on the total weight of the ink composition.

As the above water-soluble organic solvent, there may be used a water-soluble organic solvent which is incorporated in an ordinary aqueous pigment ink composition. Specific examples include polyhydric alcohols such as ethylene glycol, diethylene glycol, triethylene glycol, tetraethylene glycol, polyethylene glycol, polypropylene glycol, propylene glycol, dipropylene glycol, butylene glycol, 1,2,6-hexanetriol, thioglycol, hexylene glycol, glycerin, trimethylolethane and trimethylolpropane; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether and triethylene glycol monobutyl ether; and 2-pyrrolidone, N-methyl-2-pyrrolidone, 1,3-dimethyl-2-imidazolidinone, and triethanolamine.

The black ink composition contained in the ink set for ink-jet recording of the invention preferably further contains a preservative, a metal ion capturing agent and/or a rust preventive. As the preservative, there is preferably used at least one compound selected from the group consisting of alkylisothiazolone, chloroalkylisothiazolone, benzisothiazolone, bromo nitro alcohol, oxazolidine-based compound and chloroxylenol. As the metal ion capturing agent, there is preferably used an ethylenediamine tetraacetate. As the rust preventive, there is preferably used dicyclohexylammonium nitrate and/or benzotriazole.

The black ink composition contained in the ink set for ink-jet recording of the invention may further contain various additives such as wetting agent, moisture-preserving agent, dissolving aid, penetration inhibitor, viscosity adjustor, pH controller, oxidation inhibitor, mildew-proofing agent, corrosion inhibitor and others for the purpose of securing storage stability, inhibiting clogging, securing ejection stability and securing standing stability.

Examples of components for improving the solubility of ink components, improving the penetrating power of the ink into the recording medium such as paper or inhibiting the clogging of the nozzle, include alkyl alcohols having from 1 to 4 carbon atoms such as ethanol, methanol, butanol, propanol and isopropanol, formamide, acetamide, dimethyl sulfoxide, sorbit, sorbitan, acetyne, diacetyne, triacetyne, and sulfolan. These components may be properly selected and used.

Furthermore, a pH controller, amines such as diethanolamine, triethanolamine, propanolamine, morpholine, and modification products thereof, inorganic hydroxides such as potassium hydroxide, sodium hydroxide and lithium hydroxide, ammonium hydroxide, quaternary ammonium salts (e.g., tetramethylammonium), carbonates such as potassium carbonate, sodium carbonate and lithium carbonate, and phosphates may be used.

As the other additives, ureas such as urea, thiourea and tetramethylurea, alohanates such as alohanate and methyl alohanate, burettes such as burette, dimethyl burette and tetramethyl burette, L-ascorbic acid and salts thereof, commercially available oxidation inhibitors, and ultraviolet absorbers may be used.

The black ink composition contained in the ink set for ink-jet recording of the invention preferably has a surface tension of 45 mN/m or less, more preferably from 25 to 45 mN/m. When the surface tension exceeds 45 mN/m, the resulting print cannot be fairly dried, causing ink blurring resulting in color bleeding or the like and hence making it difficult to provide a good printed image. To the contrary, when the surface tension falls below 25 mN/m, the periphery of the nozzle in the printer head can easily wet, causing the flying of the ink droplet to be curved, and hence easily deteriorating the ejection stability. The surface tension can be measured by means of a tensiometer which is commonly used.

The surface tension of the ink can be set to the above-defined range by adjusting the kind and proportion of various components constituting the ink composition.

The black ink composition contained in the ink set for ink-jet recording of the invention can be prepared by an ordinary method.

The ink set of the invention may be an ink set for monochromatic recording or an ink set for color recording.

The ink set for monochromatic recording of the invention contains a plurality of (at least two) black ink compositions having different carbon black concentrations and further, each black ink composition contains the respective complementary colorant as described above. For example, in the case of two black ink compositions, the ink set comprises a black ink and a light black ink and each black ink contains a different complementary colorant.

The kind and number of ink compositions constituting the ink set for color recording of the invention are not particularly limited so far as plurality of black ink compositions of the invention are incorporated as constituents of the ink set. Representative examples of the ink set of the invention include five-color ink set comprising yellow, cyan, magenta, light black and black inks, seven-color ink set comprising yellow, cyan, magenta, light black, black, light cyan and light magenta inks, eight-color ink set comprising yellow, cyan, magenta, light black, black, light cyan, light magenta and dark yellow inks, seven-color ink set comprising yellow, magenta, cyan, black, light black, light magenta and light cyan inks, eight-color ink set comprising yellow, cyan, magenta, light black, black, red, green and blue inks, eight-color ink set comprising yellow, cyan, magenta, light black, black, orange, green and blue inks, and eight-color ink set comprising yellow, magenta, cyan, light black, black, orange, green and violet inks.

The term "light black" ink composition as used herein means a black ink composition having a lowered pigment (i.e., carbon black) concentration for the purpose of improving the color reproducibility with respect to dark color such as shadow area and improving the gray gradation to reduce granularity. The term "light magenta" and "light cyan" ink compositions as used herein generally means, respectively, magenta ink composition and cyan ink composition having a lowered coloring material concentration for the purpose of improving the quality of printed image by concentration fluctuation. The term "dark yellow" ink composition means a yellow ink composition which comprises a coloring material (pigment) having a lower brightness and chroma saturation than ordinary yellow ink composition for the purpose of improving the color reproducibility with respect to dark color such as shadow area. The term "red", "orange", "green", "blue" and "violet" ink compositions means ink compositions which are used as elements for constituting halftone of yellow, magenta and cyan to improve the color reproduction range.

The ink set of the invention may have the same constitution as the conventional ink set except that black ink compositions each contain carbon black and the respective complementary colorant described above. Thus, the ink set of the invention may be used as an ink for various known recording methods. The ink set of the invention is preferably aqueous one, particularly an ink set for ink-jet recording.

The recording method of the invention is a recording method which comprises ejecting a droplet of an ink composition so that it is attached to the recording medium to effect printing, wherein the ink set of the invention is used. The recording method can be suitably accomplished by mounting an ink cartridge containing the ink set of the invention (an ink cartridge individually containing each ink compositions including the black ink compositions) in a known ink-jet recording apparatus and performing printing onto a recording medium.

The ink-jet recording apparatus for use in the invention is preferably an ink-jet recording apparatus comprising an electrostrictive element which can oscillate in accordance with electrical signal and which is arranged such that the oscillation of the electrostrictive element causes ejection of an ink constituting the ink set of the invention.

As the ink cartridge (containing case) for containing the ink set, a known ink cartridge can be suitably used.

The recorded matter of the invention is obtained by printing in accordance with the recording method of the invention and hence the coloring property of carbon black can be modified and a good tint is exhibited.

The present invention will be illustrated in greater detail with reference to the following Examples, but the invention should not be construed as being limited thereto.

COMPARATIVE EXAMPLES 1 AND 2

(1) Preparation of Black Ink Compositions

With regard to the four compositions set forth in Table 1 below, individual blend components were mixed, and then dispersed with glass beads (diameter: 1.7 mm; amount: 1.5 times (by weight) that of the mixture) in a sand mill (mfd. by Yasukawa Seisakusyo Co., Ltd.) for 2 hours to obtain dark black ink compositions A1 and B1 and light black ink compositions A2 and B2. As the water-soluble resin, there was used a styrene-acrylic acid copolymer (molecular weight: 15,000; acid value: 100).

TABLE 1

| | Black ink composition (% by weight) | | | |
| --- | --- | --- | --- | --- |
| | A1 | A2 | B1 | B2 |
| Carbon black | 2.50 | 0.65 | 2.80 | 0.85 |
| Water-soluble resin (dispersant) | 1.25 | 0.33 | 1.40 | 0.43 |
| Glycerin | 20 | 18 | 18 | 18 |
| Sugar, HS500 (Hayashibara Shoji) | 3 | 10 | 4 | 10 |
| 2-Pyrrolidone | 2 | 2 | 2 | 2 |
| Triethanolamine | 0.9 | 0.9 | 0.9 | 0.9 |
| 1,2-Hexanediol | 5 | 5 | 5 | 5 |
| Surfynol 465 | 1 | 1 | — | — |
| BYK 348 | — | — | 0.5 | 0.5 |
| Proxel GXL | 0.3 | 0.3 | 0.3 | 0.3 |
| EDTA | 0.02 | 0.02 | 0.02 | 0.02 |
| Purified water | Balance | Balance | Balance | Balance |

(2) Output of Gray Scale

The dark black ink composition A1 or the light black ink composition A2 prepared in the above paragraph (1) (Ink set A; Comparative Example 1) was packed in a black ink chamber of special cartridge for an ink-jet printer (MC-2000C, mfd. by SEIKO EPSON CORPORATION) and ejected onto a special recording medium (MC photographic paper; mfd. by SEIKO EPSON CORPORATION), and thereby a gray gradation pattern from white to black (gray scale) was outputted with dividing the gradation equally into 17 stages. The output was performed by properly distributing the amount of individual inks to be ejected. The pattern thus outputted was then measured by a spectrophotometer (GRETAG SPM; mfd. by GRETAG INC.) to determine the coordinates in L*a*b* color specification system of color difference representation method defined in CIE. The measuring conditions at that time were as follows: the light source, D50; no light source filter; a white color standard, absolute white; the angle of view, 2°.

Figure 4:
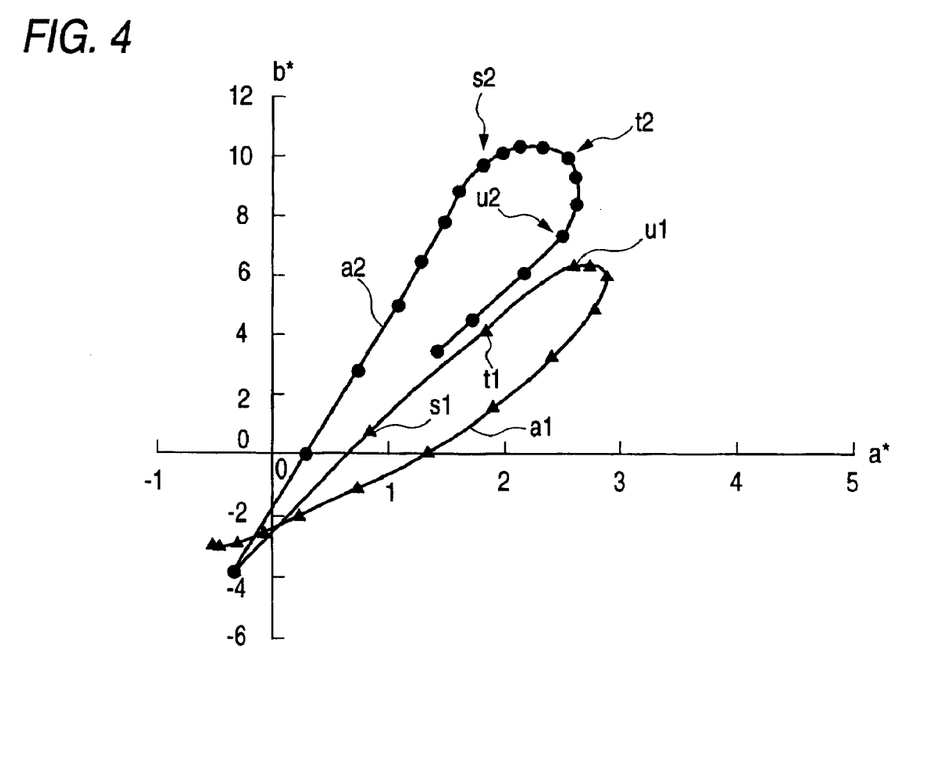
FIG. 4 is a graph showing actual gray scale loci of the dark black ink and the light black ink produced in Comparative Example 1 in the coordinates of a* and b*.

The results are shown as a curve a1 (the dark black ink composition A1) and a curve a2 (the light black ink composition A2) in FIG. 4.

In the curves a1 and a2 in FIG. 4, three points having the same supported amount of carbon black per unit area are shown. Namely, a point s1 on the curve a1 and a point s2 on the curve a2 have the same supported amount of carbon black per unit area. Similarly, a point t1 on the curve a1 and a point t2 on the curve a2 and a point u1 on the curve a1 and a point u2 on the curve a2 respectively have the same supported amount of carbon black per unit area. The distance ($\Delta C^*$) between these corresponding points was calculated by the equation (5):

$$\Delta C^* = (\sqrt{\Delta a^{*2} + \Delta b^{*2}}) \quad (5)$$

In this connection, $\Delta a^*$ represents a difference between $a^*$ values of the individual points and $\Delta b^*$ represents a difference between $b^*$ values of the individual points. The results are as follows:

The distance between s1 and s2=8.9;
The distance between t1 and t2=5.8;
The distance between u1 and u2=0.98.

Similarly, the dark black ink composition B1 or the light black ink composition B2 prepared in the above paragraph (1) (Ink set B; Comparative Example 2) was packed in a black ink chamber of special cartridge for an ink-jet printer (MC-2000C, mfd. by SEIKO EPSON CORPORATION) and ejected onto a special recording medium (MC photographic paper; mfd. by SEIKO EPSON CORPORATION), and thereby a gray gradation pattern from white to black (gray scale) was outputted with dividing the gradation equally into 17 stages. The output was performed by properly distributing the amount of individual inks to be ejected. The pattern thus outputted was then measured for color and the coordinates of a* and b* were plotted. A gray scale locus similar to the curve a1 in FIG. 4 was obtained from the dark black ink composition B1 and a gray scale locus similar to the curve a2 in FIG. 4 was obtained from the light black ink composition B2.

As is apparent from FIG. 4, in the case that no complementary colorant is added, the gray scale locus obtained from each of the dark black ink composition and the light black ink composition deviates from the origin and shows a coloring property.

EXAMPLES 1 AND 2

(1) Preparation of Black Ink Compositions

With regard to the five black ink compositions set forth in Table 2 below, individual blend components were mixed, and then dispersed with glass beads (diameter: 1.7 mm; amount: 1.5 times (by weight) that of the mixture) in a sand mill (mfd. by Yasukawa Seisakusyo Co., Ltd.) for 2 hours to obtain two ink sets. That is, an ink set X (Example 1) comprises a dark black ink compositions X1 and a light black ink composition X2 and an ink set Y (Example 2) comprises a dark black ink compositions Y1, a black ink composition for medium gradation Y2, and a light black ink composition Y3. As the water-soluble resin there was used a styrene-acrylic acid copolymer (molecular weight: 15,000; acid value: 100).

TABLE 2

| | Black ink composition (% by weight) | | | | |
| --- | --- | --- | --- | --- | --- |
| | X1 | X2 | Y1 | Y2 | Y3 |
| Carbon black | 2.4 | 0.60 | 2.5 | 0.75 | 0.20 |
| Pigment Blue 15:3 | 0.25 | — | 0.25 | — | — |
| Pigment Blue 60 | — | 0.20 | — | 0.22 | 0.10 |
| Water-soluble resin (dispersant) | 1.3 | 0.4 | 1.3 | 0.5 | 0.15 |
| Sugar, HS500 (Hayashibara Shoji) | 4 | 4 | 4 | 4 | 4 |
| Glycerin | 20 | 19 | 20 | 19 | 21 |
| Ethylene glycol | — | 9 | — | 9 | 9 |
| 2-Pyrrolidone | 2 | 5 | 2 | 5 | 5 |
| Triethanolamine | 0.9 | 0.9 | 0.9 | 0.9 | 0.9 |
| Triethylene glycol monobutyl ether | — | — | — | — | — |
| 1,2-Hexanediol | 5 | 5 | 5 | 5 | 5 |
| Surfynol 465 | 1 | 1 | — | — | — |
| BYK 348 | — | — | 0.5 | 0.5 | 0.5 |
| Proxel GXL | 0.3 | 0.3 | 0.3 | 0.3 | 0.3 |
| EDTA | 0.02 | 0.02 | 0.02 | 0.02 | 0.02 |
| Purified water | Balance | Balance | Balance | Balance | Balance |

(2) Output of Gray Scale (Ink Set X; Example 1)

An ink set X (Example 1) was constituted by the dark black ink composition X1 and the light black ink composition X2 and was packed in a special cartridge for an ink-jet printer (MC2000C, mfd. by SEIKO EPSON CORPORATION) as follows.

(a) The dark black ink composition X1 was packed in the black ink chamber of MC2000C ink cartridge.

(b) The light black ink composition X2 was packed in the cyan ink chamber of MC2000C ink cartridge.

Ejection was performed onto a special recording medium (MC photographic paper, mfd. by SEIKO EPSON CORPORATION) so as to provide a gray gradation pattern from white to black (gray scale) outputted with dividing the gradation equally into 17 stages. The output was performed by distributing the amount of the individual ink compositions to be ejected. The pattern thus outputted was then measured by a spectrophotometer (GRETAG SPM; mfd. by GRETAG INC.) to determine the coordinates in L*a*b* color specification system of color difference representation method defined in CIE. The measuring conditions at that time were as follows: the light source, D50; no light source filter; a white color standard, absolute white; the angle of view, 2°.

Figure 5:
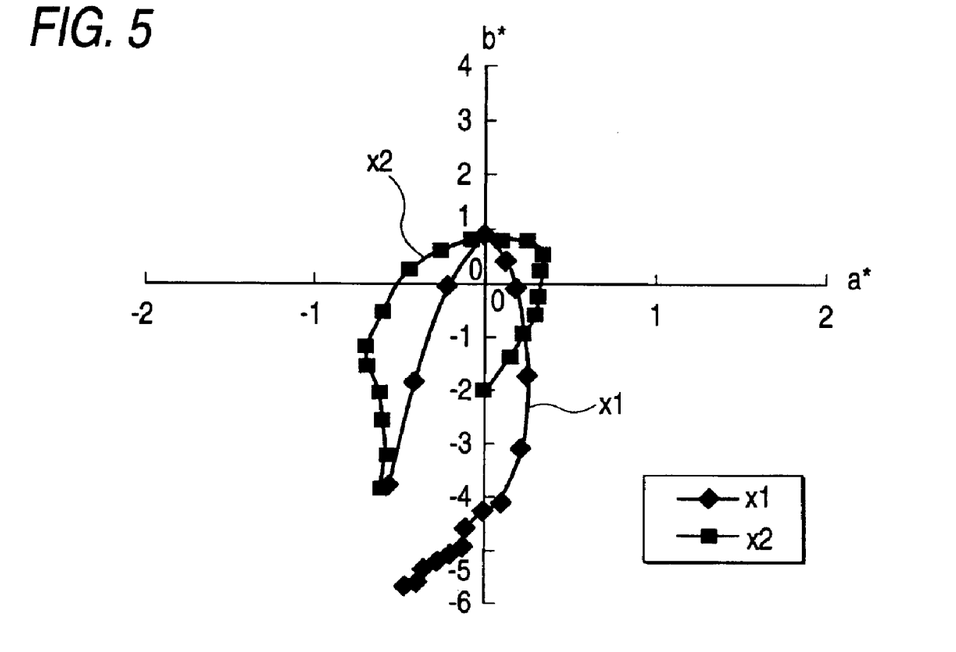
FIG. 5 is a graph showing actual gray scale loci of the dark black ink and the light black ink produced in Example 1 in the coordinates of a* and b*.

The results are shown as a curve x1 (the dark black ink composition X1) and a curve x2 (the light black ink composition X2) in FIG. 5.

(3) Output of Gray Scale (Ink Set Y; Example 2)

An ink set Y (Example 2) was constituted by the dark black ink composition Y1, the black ink composition for medium gradation Y2, and the light black ink composition Y3 and packed in a special cartridge for an ink-jet printer (MC2000C, mfd. by SEIKO EPSON CORPORATION) as follows.

(a) The dark black ink composition X1 was packed in the black ink chamber of MC2000C ink cartridge.

(b) The black ink composition for medium gradation X2 was packed in the cyan ink chamber of MC2000C ink cartridge.

(c) The light black ink composition X3 was packed in the magenta ink chamber of MC2000C ink cartridge.

Ejection was performed onto a special recording medium (MC photographic paper, mfd. by SEIKO EPSON CORPORATION) so as to provide a gray gradation pattern from white to black (gray scale) outputted with dividing the gradation equally into 17 stages. The output was performed by distributing the amount of the individual ink compositions to be ejected. The pattern thus outputted was then measured by a spectrophotometer (GRETAG SPM; mfd. by GRETAG INC.) to determine the coordinates in L*a*b* color specification system of color difference representation method defined in CIE. The measuring conditions at that time were as follows: the light source, D50; no light source filter; a white color standard, absolute white; the angle of view, 2°.

Figure 6:
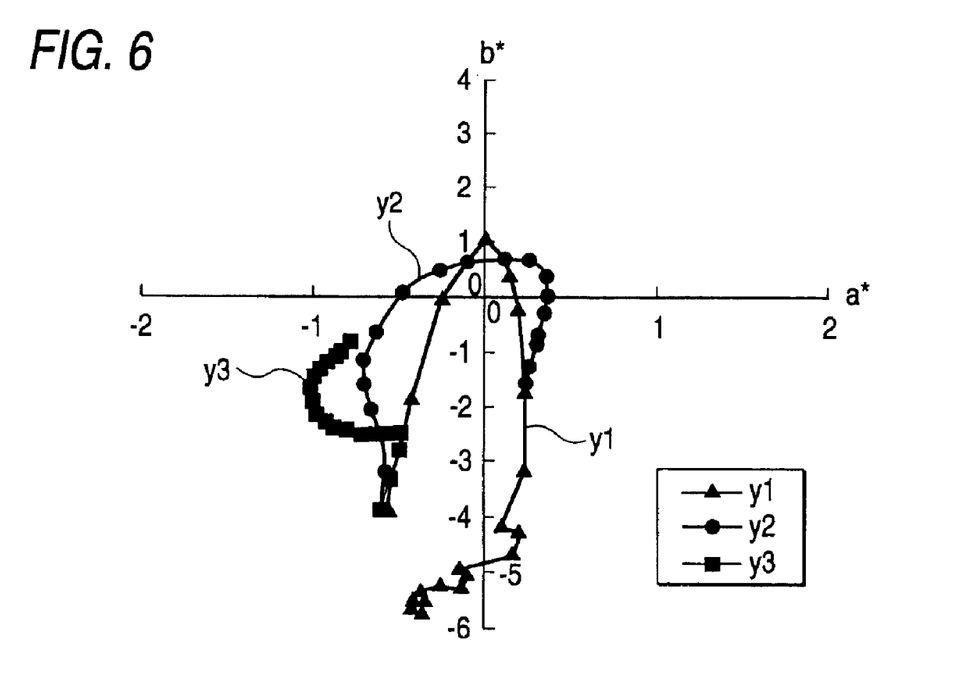
FIG. 6 is a graph showing actual gray scale loci of the dark black ink, the black ink for medium gradation and the light black ink produced in Example 2 in the coordinates of a* and b*.

The results are shown as a curve y1 (the dark black ink composition Y1), a curve y2 (the black ink composition for medium gradation Y2), and a curve Y3 (the light black ink composition Y3) in FIG. 6.

According to the invention, there is provided an ink set capable of suitably modifying the yellowing property and reddening property at the same time, in an ink set wherein a dark black ink and a light black ink are used in combination.

While the invention has been described in detail and with reference to specific embodiments thereof, it will be apparent to one skilled in the art that various changes and modifications can be made without departing from the spirit and scope thereof.

This application is based on Japanese Patent Application No. 2002-188600, the contents thereof being incorporated herein by reference.

What is claimed is:

1. An ink set comprising at least two black ink compositions each containing a carbon black and a complementary colorant, wherein the at least two black ink compositions have different carbon black contents from one another, and wherein the complementary colorants of at least two of the black ink compositions are different from one another.

2. The ink set according to claim 1, wherein the ink jet comprises the following two black ink compositions:

a light black ink composition having a low carbon black content ranging from 0.01 to 1% by weight based on the total weight of the light black ink composition; and a dark black ink composition having a high carbon black content ranging from 1 to 10% by weight based on the total weight of the dark black ink composition.

3. The ink set according to claim 2, wherein the complementary colorant of the light black ink composition is a pigment represented by general formula (1):

wherein p represents an integer of 0 to 3, and the complement colorant of the dark black ink composition is a pigment represented by formula (2):

4. The ink set according to claim 3, wherein the light black ink composition contains the pigment represented by the above general formula (1) in an amount of 0.01 to 0.5% by weight based on the total weight of the light black ink composition, and the dark black ink composition contains the pigment represented by the above formula (2) in an amount of 0.1 to 5% by weight based on the total weight of the dark black ink composition.

5. The ink set according to claim 1, wherein the ink jet comprises at least three black ink compositions including:

a light black ink composition having the lowest carbon black content ranging from 0.01 to 4% by weight based on the total weight of the light black ink composition;

a medium black ink composition for medium gradation having a medium carbon black content ranging from 0.4 to 1.5% by weight base on the total weight of the medium black ink composition; and a dark black ink composition having the highest carbon black content ranging from 1.5 to 10% by weight based on the total weight of the dark black ink composition.

6. The ink set according to claim 5, wherein the medium black ink composition for medium gradation comprises at least one of a first medium black ink composition having a carbon black content of 0.4 to 1% by weight and a second medium black ink composition having a carbon black content of 1 to 1.5% by weight.

7. The ink set according to claim 5, wherein the complementary colorant of the light black ink composition is a pigment represented by general formula (1):

wherein p represents an integer of 0 to 3, and the complementary colorant of the dark black ink composition is a pigment represented by formula (2):

8. The ink set according to claim 7, wherein the light black ink composition contains the pigment represented by the above general formula (1) in an amount of 0.01 to 0.3% by weight based on the total weight of the light black ink composition, and the dark black ink composition contains the pigment represented by the above formula (2) in an amount of 0.1 to 5% by weight based on total weight of the dark black ink composition.

9. The ink set according to claim 6, wherein the first medium black ink composition having a carbon black content of 0.4 to 1% by weight contains a pigment represented by general formula (1):

(1)

wherein p represents an integer of 0 to 3.

10. The ink set according to claim 9, wherein the first medium black ink composition having a carbon black content of 0.4 to 1% by weight contains the pigment represented by the above general formula (1) in an amount of 0.01 to 0.3% by weight based on the total weight of the first medium black ink composition.

11. The ink set according to claim 6, wherein the second medium black ink composition having a carbon black content of 1 to 1.5% by weight contains a pigment represented by general formula (1):

(1)

wherein p represents an integer of 0 to 3, and/or a pigment represented by formula (2):

(2)

12. The ink set according to claim 11, wherein the second medium black ink composition having a carbon black content of 1 to 1.5% by weight contains the pigment represented by the above general formula (1) in an amount of 0.01 to 0.3% by weight and the pigment represented by the above formula (2) in an amount of 0.1 to 5% by weight based on the total weight of the second medium black ink composition.

13. The ink set according to claim 1, which comprises aqueous ink compositions.

14. The ink set according to claim 1, wherein at least one of the black ink compositions contains at least one surfactant selected from the group consisting of an anionic surfactant, a nonionic surfactant, and an amphoteric surfactant.

15. The ink set according to claim 14, wherein the nonionic surfactant is an acetylene glycol-based surfactant.

16. The ink set according to claim 1, wherein at least one black ink composition further contains a water-soluble organic solvent.

17. A recording method comprising:
ejecting a liquid droplet of an ink composition so that the liquid droplet is attached to a recording medium to effect printing, wherein an ink set according to claim 1 is used.

18. Recorded matter which is printed in accordance with the recording method according to claim 17.

19. An ink-jet recording apparatus comprising an electrostrictive element capable of oscillating in accordance with an electrical signal and being arranged such that the oscillation of the electrostrictive element causes ejection of the ink compositions of the ink set according to claim 1.

20. A recording method comprising:
ejecting a liquid droplet of an ink composition so that the liquid droplet is attached to a recording medium to effect printing, wherein an ink set according to claim 2 is used.

* * * * *